Patented Oct. 27, 1942

2,300,275

UNITED STATES PATENT OFFICE 2,300,275

METHOD OF PRODUCING COLLOIDAL LEAD IODIDE

Alfred Dinsley, La Canada, Calif., assignor of one-half to Charles L. McCarthy, National City, Calif., and one-half to William H. Rabsahl, San Diego, Calif.

No Drawing. Application June 10, 1940, Serial No. 339,742

4 Claims. (Cl. 252—313)

My invention relates to a method of producing a colloidal lead iodide and the objects of my invention are:

First, to provide a novel colloidal lead iodide;

Second, to provide a colloidal lead iodide for use in connection with motor fuels for reducing the detonating effect of the fuel;

Third, to provide a solution of this class, which possesses all of the advantages of tetra-ethyl lead without the disadvantages of crystallization in the presence of light;

Fourth, to provide a novel method of producing colloidal lead iodide;

Fifth, to provide a novel method of producing lead iodide in composition with a colloid;

Sixth, to provide a colloidal lead iodide of this class which will not settle when exposed to light, thereby increasing its value for metallizing motor fuels;

Seventh, to provide a novel soluble iodide of lead;

Eighth, to provide a colloidal lead iodide of this class which is very simple of composition and easy and economical to produce;

Ninth, to provide a method of producing colloidal lead iodide which is very simple and inexpensive.

With these and other objects in view as will appear hereinafter, my invention consists of certain novel colloidal lead iodide and a certain novel method of producing the same as will be hereinafter described in detail and particularly set forth in the appended claims.

My colloidal lead iodide consists of the following ingredients combined in the proportions stated: Two solutions are first separately prepared; one solution consists of lead acetate ten grams dissolved in five hundred cubic centimeters of a one per cent dextrose water solution. The second solution consists of ten grams of potassium iodide dissolved in five hundred cubic centimeters of a one per cent dextrose water solution. The two solutions are then mixed together and brought to a boiling point which is continued for five minutes, after which the solution is cooled to one hundred degrees Fahrenheit and then filtered. The filtered solution is then refrigerated at thirty-two degrees Fahrenheit, or less, over a period of twelve hours, which produces gold colored crystalloids of lead iodide. This crystalloid formation is centrifuged, collected and dried and then is ready for addition to the motor fuel in the desired proportion.

It is to be noted that the proportions of both solutions and the mixed solution may be varied without departing from the spirit of the invention.

Having thus described my invention, what I claim as new and desire to secure by Letters Patent is:

1. The herein described method of preparing a colloidal lead iodide consisting in mixing together two solutions, one consisting of lead acetate, ten grams, and five hundred cubic centimeters of a one per cent dextrose solution, then preparing another solution consisting of potassium iodide, ten grams and one hundred cubic centimeters of dextrose solution, then mixing the two solutions together, then bringing the mass solution to the boiling point for five minutes, then cooling the mass solution to one hundred degrees Fahrenheit, then filtering the mass, then refrigerating the filtered solution at thirty-two degrees Fahrenheit for twelve hours, then collecting the residue by separating the same from the fluid carrier.

2. The herein described method of preparing a colloidal lead iodide consisting in mixing together two solutions, one consisting of lead acetate and dextrose solution, then preparing another solution consisting of potassium iodide and dextrose solution, then mixing the two solutions together, then bringing the mass solution to the boiling point for five minutes, then cooling the mass solution to one hundred degrees Fahrenheit, then filtering the mass, then refrigerating the solution at thirty-two degrees Fahrenheit for twelve hours, then collecting the residue by separating the same from the fluid carrier.

3. The herein described method of preparing a colloidal lead iodide consisting in mixing together a solution consisting of lead acetate, ten grams, and five hundred cubic centimeters of a one per cent dextrose solution, then mixing together another solution consisting of potassium iodide, ten grams, and five hundred cubic centimeters of a one per cent dextrose solution and then mixing the two solutions together, boiling the mass solution, then cooling the mass solution, then filtering the mass solution, then refrigerating the filtered solution, then collecting the residue by separating the same from the fluid carrier.

4. The herein described method of preparing a colloidal lead iodide consisting in mixing together a solution consisting of lead acetate and dextrose solution, then mixing together another solution consisting of potassium iodide and dextrose solution and then mixing the two solutions together, boiling the mass solution, then cooling the mass solution, then filtering the mass solution, then refrigerating the filtered solution, then collecting the residue by separating the same from the fluid carrier.

ALFRED DINSLEY.